(12) United States Patent
Agarwal et al.

(10) Patent No.: US 9,264,926 B2
(45) Date of Patent: Feb. 16, 2016

(54) METHOD AND SYSTEM FOR COMMUNICATING IN A WIRELESS COMMUNICATION SYSTEMS

(75) Inventors: Rajni Agarwal, Harrow (GB); Kevin Power, West Drayton (GB); Christopher Williams, Trowbridge (GB)

(73) Assignee: FUJITSU LIMITED, Kawasaki (JP)

( * ) Notice: Subject to any disclaimer, the term of this patent is extended or adjusted under 35 U.S.C. 154(b) by 626 days.

(21) Appl. No.: 12/482,619

(22) Filed: Jun. 11, 2009

(65) Prior Publication Data
US 2009/0310698 A1 Dec. 17, 2009

(30) Foreign Application Priority Data

Jun. 13, 2008 (EP) ..................................... 08158259

(51) Int. Cl.
*H04W 24/10* (2009.01)
*H04L 1/00* (2006.01)
(Continued)

(52) U.S. Cl.
CPC ............... *H04W 24/10* (2013.01); *H04L 1/003* (2013.01); *H04L 1/0026* (2013.01); *H04L 1/0027* (2013.01); *H04L 5/006* (2013.01); *H04L 5/0007* (2013.01); *H04L 5/0053* (2013.01); *H04L 5/0082* (2013.01); *H04L 5/0023* (2013.01); *H04L 5/0037* (2013.01); *H04L 5/0044* (2013.01); *H04L 5/0064* (2013.01); *H04L 5/0085* (2013.01); *H04L 5/0094* (2013.01); *H04L 25/0228* (2013.01)

(58) Field of Classification Search
CPC ..... H04L 1/0026; H04L 5/0053; H04L 5/006; H04L 5/0082

USPC ......................................................... 370/206
See application file for complete search history.

(56) References Cited

U.S. PATENT DOCUMENTS

| 7,724,722 B2 * | 5/2010 | Seo et al. ....................... 370/344 |
| 2003/0148770 A1 * | 8/2003 | Das et al. ...................... 455/455 |
| 2006/0116080 A1 | 6/2006 | Eom |

(Continued)

FOREIGN PATENT DOCUMENTS

| EP | 1 613 117 | 1/2006 |
| EP | 1 679 924 | 7/2006 |

(Continued)

OTHER PUBLICATIONS

European Search Report and Annex to the European Search Report on European Patent Application No. EP08158259, dated Jan. 8, 2009.

(Continued)

*Primary Examiner* — Omer S Mian
(74) *Attorney, Agent, or Firm* — Myers Wolin, LLC

(57) ABSTRACT

A method of requesting a plurality of different characteristic indicators from a second communication apparatus (MS) in a wireless communication network comprising a first communication apparatus (BS) and a plurality of such second communication apparatuses (MS) which communicate with the first communication apparatus using a shared communication frame, the method comprising; the first communication apparatus (BS) transmitting (110) a single standing instruction to the second communication apparatus (MS) to interchange between sending the different characteristic indicators in a feedback window allocated to the second communication apparatus in the shared communication frame.

17 Claims, 11 Drawing Sheets

(51) Int. Cl.
*H04L 5/00* (2006.01)
*H04L 25/02* (2006.01)

(56) References Cited

U.S. PATENT DOCUMENTS

| | | | |
|---|---|---|---|
| 2007/0026808 A1* | 2/2007 | Love et al. | 455/67.7 |
| 2007/0274253 A1 | 11/2007 | Zhang et al. | |
| 2008/0069031 A1* | 3/2008 | Zhang et al. | 370/328 |
| 2008/0165875 A1* | 7/2008 | Mundarath et al. | 375/262 |
| 2009/0154588 A1* | 6/2009 | Chen et al. | 375/267 |
| 2009/0209256 A1* | 8/2009 | Nakashima et al. | 455/436 |
| 2009/0219852 A1* | 9/2009 | Youn et al. | 370/315 |
| 2009/0232233 A1* | 9/2009 | Duan et al. | 375/260 |
| 2010/0113078 A1* | 5/2010 | Farajidana et al. | 455/507 |
| 2010/0254291 A1* | 10/2010 | Youn et al. | 370/311 |
| 2011/0141940 A1 | 6/2011 | Kim et al. | |

FOREIGN PATENT DOCUMENTS

| | | |
|---|---|---|
| GB | 2 443 464 | 5/2008 |
| JP | 2006-524931 | 11/2006 |
| WO | WO 2007132861 A1 * | 11/2007 |

OTHER PUBLICATIONS

IEEE Computer Society; "Part 11: Wireless LAN Medium Access Control (MAC) and Physical Layer (PHY) specifications, Amendment 4: Further Higher Data Rate Extension in the 2.4 GHz Band"; IEEE Std 802.11g-2003; Published by IEEE, 3 Park Avenue, New York, NY 10016-5997; Dated Jun. 27, 2003.

IEEE Computer Society and the IEEE Microwave Theory and Techniques Society; "Part 16: Air Interface for Fixed and Mobile Broadband Wireless Access Systems, Amendment 2: Physical and Medium Access Control Layers for Combined Fixed and Mobile Operation in Licensed Bands and Corrigendum 1"; IEEE Std 802.16e 2005 and IEEE Std 802.16-2004/Cort-2005 (Amendment and Corrigendum to IEEE Std 802.16-2004); Published by IEEE, 3 Park Avenue, New York, NY; Dated Feb. 28, 2006.

WiMAX Forum; "Mobile System Profile Release 1.0 Approved Specification", (Revision 1.4.0: May 2, 2007); Document Developed by the WiMAX Forum Technical Working Group (TWG); Revision Dated May 2, 2007.

Notification of Reason(s) for Refusal issued for corresponding Japanese Patent Application No. 2009-141672 mailed Feb. 21, 2012 with partial English translation.

* cited by examiner

| Syntax | Size (bit) | Notes |
|---|---|---|
| CQICH_Allocation_IE () { | - | - |
| Extended UIUC | 4 | CQICH=0x03 |
| Length | 4 | Length in bytes |
| CQICH_ID | variable | Index to uniquely identify the CQICH resource assigned to the SS. The size of this field is dependent on system parameter defined in UCD. |
| Allocation offset | 6 | Index to the fast feedback channel region marked by UIUC = 0. |
| Period (p) | 2 | A CQI feedback is transmitted on the CQICH every 2 p frames. |
| Frame offset | 3 | The SS starts reporting at the frame of which the number has the same 3 LSB as the specified frame offset. If the current frame is specified, the SS should start reporting in eight frames |
| Duration (d) | 3 | A CQI feedback is transmitted on the CQI channels indexed by the CQICH_ID for 10 x 2d frames. If d == 0, the CQI-CH is deallocated. If d == 0b111, the SS should report until the BS command for the SS to stop. |

FIG. 5

| | | |
|---|---|---|
| Report configuration included | 1 | Update to CINR report configuration is included. |
| Alternate Reports | 2 | Max. of 4 alternate reports on same CQICH_ID |
| For ( n=0; n< Alternate Reports; n++){ | | |
| If (report configuration included == 1) { | - | - |
| Feedback Type | 2 | 0b00: Physical CINR feedback<br>0b01: Effective CINR feedback<br>0b10–0b11: *Reserved* |
| Report type | 1 | 0: Report for preamble<br>1: Report for specific permutation zone |
| If (Report type == 0) { | - | - |
| CINR preamble report type | 1 | The type of preamble-based CINR report<br>0: Frequency reuse factor = 1 configuration.<br>1: Frequency reuse factor = 3 configuration. |
| } | - | - |
| Else{ | - | Report for permutation zone. |

FIG. 5 (continued)

| | | |
|---|---|---|
| Zone permutation | 3 | The type of zone for which to report<br>0b000: PUSC with Use All SC = 0<br>0b001: PUSC with Use All SC = 1<br>0b010: FUSC<br>0b011: Optional FUSC<br>0b100: Safety channel region<br>0b101: AMC zone (for DL_AAS zone or AMC Zone with dedicated pilots)<br>0b110–111: Reserved |
| Zone type | 2 | 0b00: Non-STC zone<br>0b01: STC zone<br>0b10: AAS zone or Non-STC zone with dedicated pilots<br>0b11: STC zone with dedicated pilots |
| Zone PRBS_ID | 2 | The PRBS_ID of the zone on which to report |
| If (Zone permutation== 0b000 or 0b001) { | - | - |
| Major group indication | 1 | If 0, then the report may refer to any subchannel in the PUSC zone. |
| If (Major group indication == 1) { | - | - |

FIG. 5 (continued)

| | | |
|---|---|---|
| PUSC Major group bitmap | 6 | Reported CINR shall only apply to the subchannels of PUSC major groups for which the corresponding bit is set. Bit #k refers to major group k. |
| } | - | - |
| } | - | - |
| CINR zone measurement type | 1 | 0: Measurement from pilot subcarriers and, if AAS zone, from AAS preamble.<br>1: Measurement from data subcarriers |
| } | - | - |
| If (feedback type == 0b00) { | - | Physical CINR feedback |
| Averaging parameter included | 1 | - |
| If (Averaging parameter included == 1) { | - | - |
| Averaging parameter | 4 | Averaging parameter used for deriving physical CINR estimates reported through CQICH. This value is given in multiples of 1/16 in the range of [1/16..16/16] in increasing order. |
| } | - | - |
| } | - | - |
| } | - | - |

FIG. 5 (continued)

| | | |
|---|---|---|
| MIMO_permutation_feedback_cycle | 2 | 0b00 = No MIMO and permutation mode feedback<br>0b01 = The MIMO and permutation mode indication shall be transmitted on the CQICH indexed by the CQICH_ID every four allocated CQICH transmission opportunity. The first indication is sent on the fourth allocated CQICH transmission opportunity.<br>0b10 = The MIMO mode and permutation mode indication shall be transmitted on the CQICH indexed by the CQICH_ID every eight allocated CQICH transmission opportunity. The first indication is sent on the eighth allocated CQICH transmission opportunity.<br>0b11 = The MIMO mode and permutation mode indication shall be transmitted on the CQICH indexed by the CQICH_ID every 16 allocated CQICH transmission opportunity. The first indication is sent on the 16th allocated CQICH transmission opportunity |
| } | | |
| Padding | variable | Number of bits required to align to byte length, shall be set to zero. |
| } | | |

FIG. 5 (continued)

| No. of Users/Sector | Required PUSC slots for CQICH | | | |
|---|---|---|---|---|
| | n=1 | n=2 | n=4 | n=8 |
| 64 | 128 | 64 | 32 | 16 |
| 24 | 48 | 24 | 12 | 6 |
| 8 | 16 | 8 | 4 | 2 |

FIG. 6

METHOD AND SYSTEM FOR COMMUNICATING IN A WIRELESS COMMUNICATION SYSTEMS

This application claims priority to European Patent Application No. 08158259.5 filed on Jun. 13, 2008, the disclosure of which is expressly incorporated herein by reference in its entirety.

This invention relates to indicators of characteristic properties which are usually sent from mobile stations (MSs) and relay stations (RSs) towards the base station (BS) in a wireless communication network. Such indicators or reports can be used to provide information on the uplink relating to the MS or RS, and/or its environment or requirements. For instance, the indicators may relate to bandwidth requirements, the type of service required or channel parameters such as channel quality. In one specific example, such an indicator provides a measure of the channel quality between the base station and relay or mobile station concerned. Of course if there are relays involved in the transmission path, the indicators can be used by a relay station to determine the channel quality or other indicator in the previous link from another relay station or from a mobile station. Such reports can be used to identify changes needed in transmission parameters to maximise use of resources while retaining acceptable service for the user of the system.

One area of technology in which such reports are used is multi-carrier transmission. In a multi-carrier transmission system, such as FDM (frequency division multiplex), OFDM (orthogonal frequency division multiplex) or DMT (discrete multi-tone), a single data stream is modulated onto N parallel sub-carriers, each sub-carrier signal having its own frequency range. This allows the total bandwidth (i.e. the amount of data to be sent in a given time interval) to be divided over a plurality of sub-carriers thereby increasing the duration of each data symbol. Since each sub-carrier has a lower information rate, multi-carrier systems benefit from enhanced immunity to channel induced distortion compared with single carrier systems.

Orthogonal frequency division multiplexing (OFDM) is a modulation technique that is based on FDM. An OFDM system uses a plurality of sub-carrier frequencies which are orthogonal in a mathematical sense so that the sub-carriers' spectra may overlap without interference due to the fact they are mutually independent. The orthogonality of OFDM systems removes the need for guard band frequencies and thereby increases the spectral efficiency of the system. OFDM has been proposed and adopted for many wireless systems. It is currently used in Asymmetric Digital Subscriber Line (ADSL) connections, in some wireless LAN applications (such as WiFi devices based on the IEEE802.11a/g standard), and in wireless MAN applications such as WiMAX (based on the IEEE 802.16 standard). OFDM is often used in conjunction with channel coding, an error correction technique, to create coded orthogonal FDM or COFDM. COFDM is now widely used in digital telecommunications systems to improve the performance of an OFDM based system in a multipath environment where variations in the channel distortion can be seen across both sub-carriers in the frequency domain and symbols in the time domain. The system has found use in video and audio broadcasting, such as DVB and DAB, as well as certain types of computer networking technology.

In an OFDM system, a block of modulated parallel data source signals is mapped to N orthogonal parallel sub-carriers (known as sub-channels) by using an Inverse Discrete or Fast Fourier Transform algorithm (IDFT/IFFT) to form a signal known as an "OFDM symbol" in the time domain at the transmitter. Thus, an "OFDM symbol" is the composite signal of all N sub-carrier signals.

OFDMA (Orthogonal Frequency Division Multiple Access) is a multiple access variant of OFDM. It works by assigning a subset of sub-channels to an individual user. This allows simultaneous transmission from several users leading to better spectral efficiency. However, there is still the issue of allowing bi-directional communication, that is, in the uplink and download directions, without interference.

In order to enable bi-directional communication between two nodes, two well known different approaches exist for duplexing the two (forward or downlink and reverse or uplink) communication links to overcome the physical limitation that a device cannot simultaneously transmit and receive on the same resource medium. The first, frequency division duplexing (FDD), involves operating the two links simultaneously but on different frequency bands by subdividing the transmission medium into two distinct bands, one for forward link and the other for reverse link communications. The second, time division duplexing (TDD), involves operating the two links on the same frequency band, but subdividing the access to the medium in time so that only the forward or the reverse link will be utilizing the medium at any one point in time. Both approaches (TDD & FDD) have their relative merits and are both well used techniques for single hop wired and wireless communication systems. For example the IEEE802.16 WiMAX standard incorporates both an FDD and TDD mode.

As an example, FIG. 1 illustrates the single hop TDD frame structure used in the OFDMA physical layer mode of the IEEE802.16 WiMAX standard. The WiMAX frame, in common with frames from other similar transmission systems, is a time-frequency format for use in assigning available transmission frequency bandwidth during a discrete transmission interval. The format defines transmission windows within such an interval, each window occupying an allocated time (in terms of symbols) and frequency (in terms of sub-carriers or sub-channels) within the frame.

Each frame is divided into downlink (DL) and uplink (UL) subframes, each being a discrete transmission interval. They are separated from each other by a guard interval and another guard interval can separate two consecutive frames.

The first symbol of the frame is occupied by a preamble which is mainly used for synchronisation purposes, but is also used for transmitter identification during network entry and handover procedures. On the second and third symbols following the preamble is the FCH. The FCH is transmitted using a well-known format and provides sufficient information to decode the following MAP message, i.e. the MAP message length, coding scheme and active sub-channels. Following the FCH is the DL-MAP (the MAP message defining burst start times on the downlink) which may be followed by the UL-MAP (the information defining access on the uplink). These MAP messages provide information on the allocated resource (slots) for traffic and control channels within the frame. These MAP's contain DL-MAP_IE's (information elements) and UL-MAP_IE's which define bursts within the frames, (i.e. one MAP_IE will be related to 1 burst within the frame). The information within these MAP_IE's, such as the subchannel offset and symbol offset are crucial as these are used by the MS (mobile station) to locate the resource within the subframes.

The 802.16e-2005 standard specifies many possible frame durations ranging from 2 ms to 20 ms in length. However, the current WiMAX forum profile (Release 1.0), specifies that only 5 ms frames shall be used as this will help ensure that all WiMAX forum certified equipment is interoperable.

The current WiMAX standard, like many other currently developing standards, defines advanced features and transmission techniques which if combined, can potentially improve the system throughput and ultimately ensure that the user experiences the best possible performance. However, for all these standards, in order for the combinations to operate efficiently, the Base Station (BS) (or relay station (RS) for intermediate links) will need reports of the characteristics of the MS and its link to the BS (or RS). For example, the BS requires knowledge of the propagation channel that the Mobile Station (MS) is experiencing. For this, in WiMAX systems, the BS will allocate the MS at least one specific CQICH window or channel that resides within the CQICH region shown in the uplink subframe in FIG. 1. This CQICH region will comprise an integer number of slots (1 subchannel by 3 OFDMA symbols in this zone), where one slot can be used as a CQICH channel for a single MS. For the purposes of the CQICH region, a Fast Feedback IE will be transmitted in the UL-MAP which will inform all MSs of its location within the UL subframe (i.e. subchannel and symbol offsets). This allocated CQICH channel can be used by the MS to report either Physical or Effective SINR (or CINR), one of which will be instructed by the BS. The MS will calculate a channel quality measurement in terms of Physical or Effective CINR which will provide information on the actual operating condition of the receiver, including interference and noise levels, and signal strength. This information is then fed back to the BS via the allocated CQI feedback channel (CQICH) and as a result the BS may use this to efficiently manage its radio resources or to perform basic link adaptation for the MS.

The current systems allow two concurrent CQICH channels to be supported by any MS, where one channel will be used for Physical CINR reports and the other for Effective CINR measurements. However, for a system employing many features to maximise system performance such as adaptive MIMO switching or FFR, having only two CQICH channels per MS makes it very difficult for the BS to accurately adapt to the best possible radio configuration or efficiently manage the radio resources. It may make sense therefore to increase the number of available CQICH channels per MS, but this would be at the expense of reducing uplink capacity and thus diminishing the accessible radio resource for raw data.

Another way of obtaining extra information would be to use MAC layer management messages, rather than dedicated control in the PHY layer. However, such feedback mechanisms can introduce MAC and PHY signaling overheads as well as unpredictable delays. For example, use of a MAC layer request for a report from the BS and a response from the MS (REP-REQ/RSP) necessitates control in the PHY layer (DL_MAP_IE and UL_MAP_IE messages). Moreover, as this type of MAC messaging structure is transported via a data zone, the MS will have to perform a Bandwidth Request procedure which can increase delays as well as signaling overhead.

It is desirable to overcome the disadvantages of the previous methodology.

According to the present invention there is provided a method of requesting a plurality of different characteristic indicators from a second communication apparatus in a wireless communication network comprising a first communication apparatus and a plurality of such second communication apparatuses which communicate with the first communication apparatus using a shared communication frame, the method comprising; the first communication apparatus transmitting a single standing instruction to the second communication apparatus to interchange between sending the different characteristic indicators in a feedback window allocated to the second communication apparatus in the shared communication frame.

Embodiments of the invention propose a novel signalling mechanism by which a BS (example of a first communication apparatus) can instruct an MS (example of a second communication apparatus) to interchange reports giving different measures (indicators) in the same window. This can therefore provide extra information without any significant increase in the signalling overhead in the UL-MAP. The CQICH_Allocation_IE (or equivalent message for another indicator) can be sent once, to inform the MS to alternately report a number of different measurements in the same feedback window (on the same CQICH channel if we follow the CQICH example). This concept may be extremely beneficial to algorithms that do not need the same report at every opportunity. The report type can be switched between a number of different reports that the BS may find useful in efficiently managing the radio resources, thus leading to an improved system performance.

Previously, it was understood that an independent instruction should be sent for each characteristic indicator or report. Surprisingly, the inventors have found that it is possible to solve the complex balance between increasing transmission technique complexity and limitations in radio resource by the simple measure of switching between sending a plurality of different property indicators using a single standing instruction. Implementing such switching can allow slower feedback measures in the MAC layer to be avoided, improve accuracy and speed of link and radio adaptation and reduce downlink and uplink signalling overhead, so that network capacity can be increased.

Embodiments of the invention allow a feedback window (or channel) allocated to the second communication apparatus to be used flexibly so that it sometimes transmits one characteristic indicator and sometimes transmits another. The different characteristic indicators may be interchanged so that consecutive shared communication frames present a different indicator. For example, if there are two indicators these may alternate or be interchanged in another pattern. For more than two indicators, these can be interchanged in a regular pattern.

According to a preferred embodiment, at least one of the characteristic indicators is an indicator which is not used for assessing transmission at the time when the method commences. Such an indicator may be of an alternative transmission option to the one currently in use. Interchanging between different indicators permits more indicators to be used in the same time period than was previously the case, so allows the possibility of indicators being transmitted which correspond to a transmission technique not currently used, or a situation which has not yet occurred. This has the advantage of allowing the BS to compare the current transmission situation with available alternatives without extra signalling and its attendant DL overhead and time delay (latency). Such fast channel adaptation is particularly advantageous for high mobility users. Effectively, pre-established signalling from the MS can lead the BS to instruct a change in transmission option/technique based on the interchanging indicators transmitted to the BS and the MS can thus indirectly initiate a change.

As an example, if an MS is presently operating in a first zone within a WiMAX frame, one of the characteristic indicators may provide information relating to parameters (such as channel quality) in another zone. This can allow the BS to compare the indicators for channel quality in the first zone and in the other zone and potentially to instruct a switch into another zone (radio configuration adaptation). Equally, indicators can provide information as to alternative link adaptation information (MCS variants) that would be most suited to the MS in the other zone.

Some specific alternative transmission techniques which embodiments of the invention help the BS to select between may include: two or more frequency reuse modes; localized or distributed subchannelization; and different MIMO modes.

In preferred embodiments, the first communication apparatus also transmits to the second communication apparatus a specification of the feedback window, including a feedback timing and a feedback frequency range within the shared communication frame. The specification of the feedback window may be transmitted at the same time as the single standing instruction and as part of the single standing instruction or it may be transmitted separately.

In some embodiments, not all shared communication frames in a sequence of shared communication frames are allocated a feedback window for the second communication apparatus. For example, every other, every fourth, or every eighth uplink frame may include such an indicator and the resource occupied by the feedback window may otherwise be used for a feedback window for another second communication apparatus. In a preferred embodiment, the first communication apparatus instructs the interval at which the shared communication frame includes the feedback window. To achieve this, the standing instruction could simply indicate the periodicity of the characteristic indicator in terms of the frame interval between indicators.

In some preferred embodiments, the feedback window accommodates a single characteristic indicator only. This feedback window can provide as many characteristic indicators as required by interchanging between providing these different indicators, so that a single feedback window only is allocated to the MS (second communication apparatus). Thus only one feedback window (or slot in the WiMAX example) need be allocated to each MS. This has a clear advantage in doubling the MS capacity in the UL feedback region with respect to the current WiMAX implementation.

In other embodiments, two feedback windows may be provided per second communication apparatus (MS), each of these feedback windows having interchanging characteristic indicators. For example, each feedback window could be a slot in a WiMAX frame allocated to the second communication apparatus in question, where each slot accommodates two channel quality indicators by alternating between these indicators in the shared communication frames which include the feedback window. Of course, other suitable interchange patterns will be possible, depending on the system requirements.

In the above method, the first communication apparatus may transmit the standing instruction in a downlink frame, instructing the second communication apparatus to send the characteristic indicators in subsequent uplink frames. In a specific example, the UL_MAP can include an IE (Information Element) which acts as a standing instruction to the MS to transmit the characteristic indicators in subsequent uplink frames in the fast feedback (CQICH) region of the uplink frames.

In a further embodiment, the characteristic indicators can be used in the first communication apparatus to assess transmission parameters and modify them as necessary. For example, the transmission parameters assessed and potentially modified may be selected from parameters assessing suitability of one or more of the alternative transmission techniques mentioned above.

In a specific preferred embodiment, the system operates under the WiMAX standard and the characteristic indicators are channel quality indicators (CQI's), with one or two feedback windows for each second communication apparatus being provided at the specified frame interval for CQI purposes; a single slot acting as a feedback window.

If there is a single slot per frame, the use of this slot must rotate between all of the CQI's required. In the embodiment with two slots allocated per frame, then half of the CQI's required could be presented in one slot and the other half in another slot. Alternatively, a different pattern of rotation could be adopted in this second possibility if it appears advantageous.

According to a second aspect of the present invention there is provided a method of transmitting a plurality of different characteristic indicators from a second communication apparatus in a wireless communication network comprising a first communication apparatus and a plurality of such second communication apparatuses, the method comprising: the second communication apparatus receiving a single standing instruction from the first communication apparatus to interchange between sending the different characteristic indicators in a feedback window allocated to the second communication apparatus in the shared communication frame and transmitting the characteristic indicators as instructed.

This method is the counterpart to the first aspect with respect to the steps carried out in the second communication apparatus.

In preferred embodiments the second communication apparatus determines the characteristic indicators, for example from pilot signals. This determination may also be from transmitted data.

In the above method the second communication apparatus may send the interchanging characteristic indicators for a certain period of time or until the standing instruction is superseded. For example, a further standing instruction may be issued or a superseding instruction. In cases where the second communication apparatus is moving or a call is terminated, the superseding instruction may not be specifically related to the characteristic indicator but instead demonstrate a change of state for the second communication apparatus or its status.

In a further aspect of the present invention there is provided a method of providing a first communication apparatus with a plurality of different characteristic indicators from second communication apparatuses in a wireless communication network comprising the first communication apparatus and a plurality of such second communication apparatuses which communicate with the first communication apparatus using a shared communication frame, the method comprising; the first communication apparatus transmitting a single standing instruction to each second communication apparatus to interchange between sending the different characteristic indicators in a feedback window allocated to that second communication apparatus in the shared communication frame; and each second communication apparatus receiving the standing instruction from the first communication apparatus and interchanging between sending the different characteristic indicators in a feedback window in the shared communication frame.

This further aspect relates to steps in both the first and the second communication apparatuses.

In a yet further aspect of the present invention there is provided a first communication apparatus in a communications network comprising the first communication apparatus and a plurality of second communication apparatuses which communicate with the first communication apparatus using a shared communication frame, the first communication apparatus comprising: decision circuitry operable to decide for each second communication apparatus which of a plurality of different characteristic indicators are to be transmitted and to decide for each second communication apparatus an interchange pattern of transmission of the different characteristic indicators within a sequence of shared communication frames; and a transmitter operable to transmit a single standing instruction to each second communication apparatus to interchange as per the pattern between sending the different characteristic indicators in a feedback window in the shared communication frame.

Further circuitry (or means) can be provided in the first communication apparatus corresponding to the relevant method steps in the foregoing method statement.

In a still further aspect of the present invention there is provided a second communication apparatus in a communications network comprising a first communication apparatus and a plurality of such second communication apparatuses which communicate with the first communication apparatus using a shared communication frame, the second communication apparatus comprising: a receiver operable to receive a single standing instruction to interchange between sending a plurality of different characteristic indicators in a feedback window in the shared communication frame; determination circuitry operable to determine the different characteristic indicators; and control and transmission circuitry operable to interchange between transmitting the different characteristic indicators as per the standing instruction.

Further circuitry (or means) of the second communication apparatus can be provided to carry out the appropriate preferred steps of the foregoing method.

In a final aspect of the present invention there is provided a wireless communication network comprising a first communication apparatus and a plurality of second communication apparatuses which communicate with the first communication apparatus using a shared communication frame, wherein: the first communication apparatus is operable to transmit a single standing instruction to each second communication apparatus to interchange between sending a plurality of different characteristic indicators in a feedback window allocated to that second communication apparatus in the shared communication frame; and each second communication apparatus is operable to receive the standing instruction from the first communication apparatus and to interchange between sending the different characteristic indicators in a feedback window in the shared communication frame.

In any of the above aspects, the various features may be implemented in hardware, or as software modules running on one or more processors or as a mixture of software and hardware. References to circuitry are therefore to be interpreted broadly. Features of one aspect may be applied to any of the other aspects as appropriate.

The invention also provides a computer program or a computer program product for carrying out any of the methods described herein, and a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

For a better understanding of the present invention, and to show how the same may be carried into effect, reference will now be made, by way of example to the accompanying drawings in which:

FIG. 5 is an illustration of a CQICH allocation IE according to an embodiment of the preferred invention; and FIG. 6 is a table demonstrating resource usage according to an embodiment of the invention in different scenarios.

The following description outlines the invention as applied to CQI measures in WiMAX, but the skilled person will appreciate the general applicability of the approach demonstrated.

In the particular prior art situation in WiMAX, the BS will instruct which type of measurement is to be reported on each CQICH channel via two independent CQICH_Allocation_IEs which will be transmitted within the UL-MAP. These information elements can be sent once to the MS and the MS can periodically (for n frames) report the required measurements on the specified channel indicted by a CQICH_ID.

The BS may instruct the MS to report for instance, a Physical CINR measurement (which requires knowledge of the MS channel) of preamble reuse-1 on the first CQICH channel as this may give the BS enough information from all the MSs to perform a technique known as Fractional Frequency Reuse (FFR). In FFR, the users at the cell/sector edge operate with a fraction of all sub-channels available while the inner cell users operate with all sub-channels available. Usually, the cell edge users are operated with frequency reuse=3 (called R3) indicating that 1 in 3 sub-channels is used, the others being reserved for the neighbouring cell or cells. The inner cell users are operated in R1 (all sub-channels used). In frame transmission aspects, the R3 users are grouped into a separate time period in the frame (called a zone), which is separated in time from the R1 zone. The perceived benefits of FFR lies with the provision of a better signal quality to the cell edge users, through the physical isolation of the interference sources. It is expected that the improved signal quality can also bring in higher throughput for the cell edge users. However, this comes at the cost of reduced resource availability.

On the second CQICH channel the BS may instruct the MS to report an Effective CINR measurement (effective CINR measurement does not require the channel of the MS and is based on pilot or data subcarriers from a data block or zone) as this can be used to adequately perform link adaptation (MCS provision specific to the MS). However, some would say that FFR can be managed more efficiently if the BS also has knowledge of Physical CINR measurement of preamble reuse-3, because that will allow an idea of whether the MS should move to the R3 zone by comparing the CINR values for the different zones. In this case, the BS would have to send another CQICH_Allocation_IE that will now specify the new measurement required on the first CQICH channel. This is a clear constraint in the current system as it will unnecessarily lead to an increased overhead in the UL-MAP and reduced efficiency in resource management.

CQICH Signalling Mechanism

Figure 1:
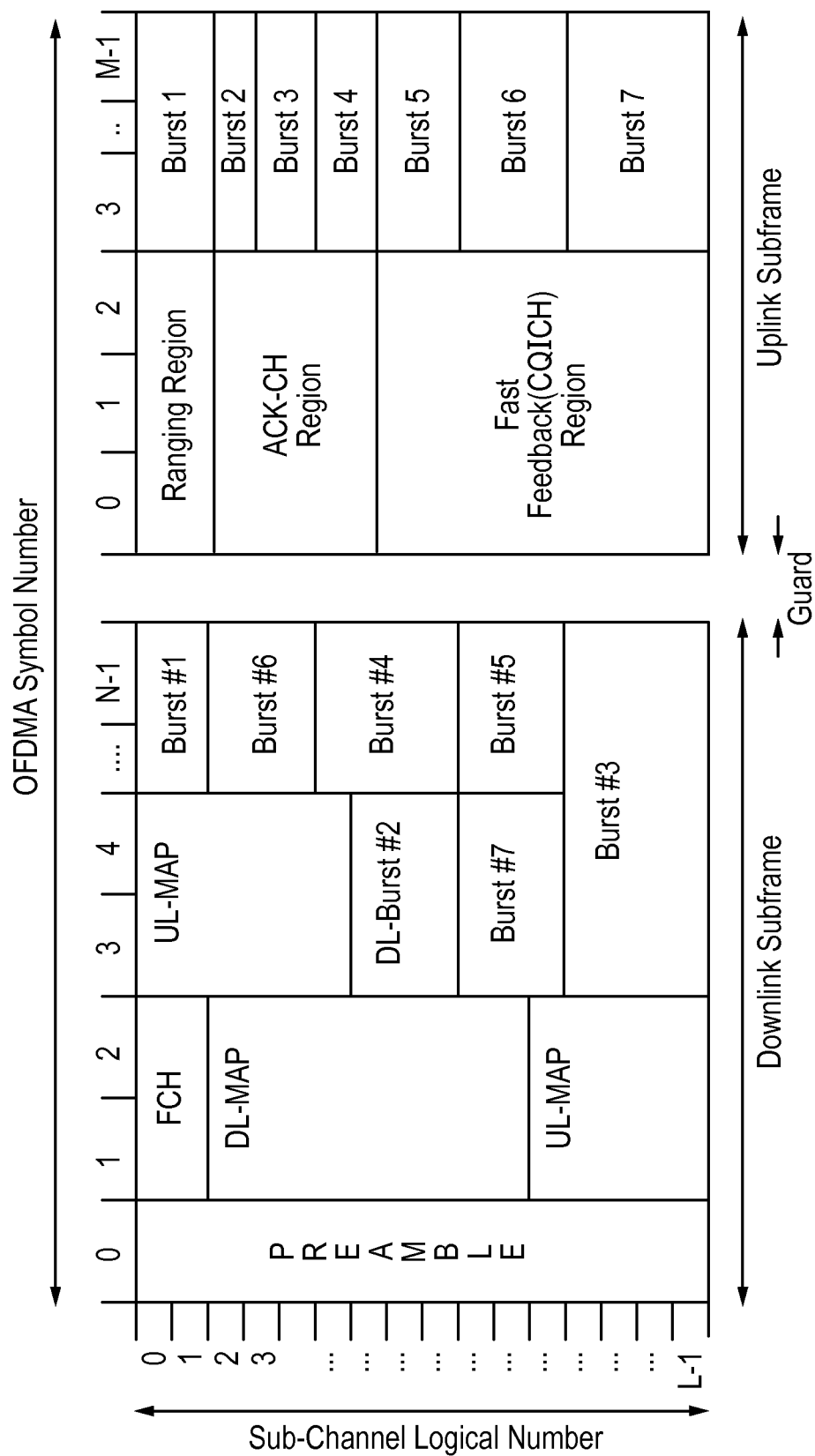
FIG. 1 is a schematic diagram illustrating the structure of a TDD OFDMA frame structure in 802.16E-2005.
Figure 2:
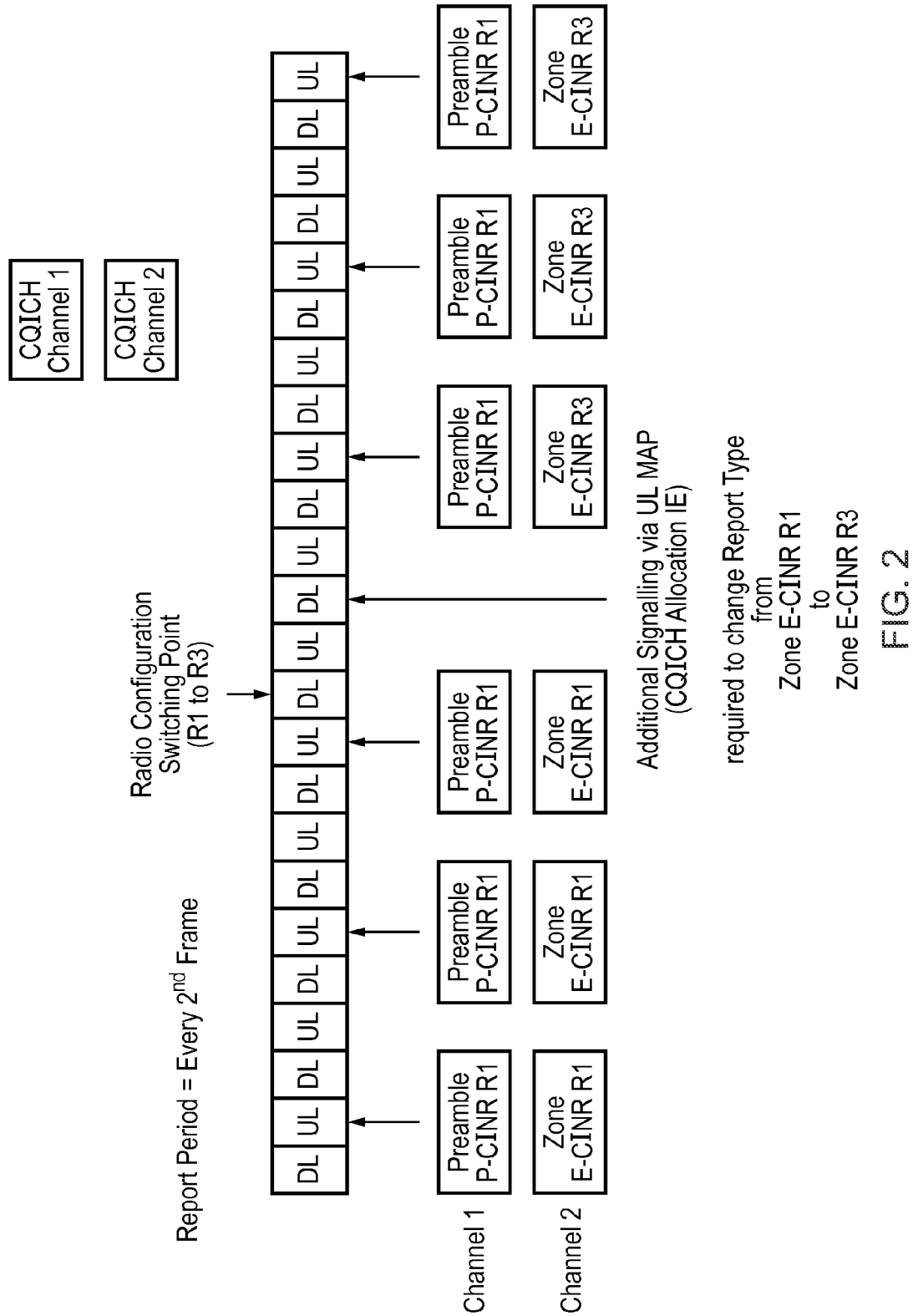
FIG. 2 is an illustration of CQICH limitation in the prior art.

FIG. 2 demonstrates the current problem that is seen with regard to the limitations/problems of the existing standard. As stated previously, the MS shall only be allocated a maximum of two CQICH channels per frame within the CQICH Fast Feedback region shown in uplink subframe of FIG. 1. The example is focussed on the FFR case, where the BS will collect all the information required to effectively distribute the users between Reuse-1 (R1) and Reuse-3 zones (R3). In this case, we can assume that a specific MS is allocated in a Reuse-1 zone, and the CQICH channels for this MS may be assigned as follows;

CQICH Channel 1 (Physical CINR from Preamble R1)—For zone selection

CQICH Channel 2 (Effective CINR from Pilots of R1 zone)—For Link Adaptation

Here, the Physical CINR report will be used by the BS to adaptively switch the MS between R1 and R3 zones (radio configuration adaptation) whereas the Effective CINR report shall be used for performing link adaptation (MCS selection within a zone). This configuration is further illustrated in FIG. 2, where Channel 1 is shown above Channel 2.

FIG. 2 highlights the scenario where the BS may decide to switch a MS (user) from an R1 to R3 zone. This can be termed as the Radio Configuration Switch Point as the MS radio characteristics will now change. It is therefore clear that the MS will now be allocated data within the R3 zone. In this case, the BS will have to send another CQICH_Allocation_IE (related to Channel 2) to inform the MS to measure and report the Effective CINR for R3 zone to allow for accurate link adaptation (MCS selection). Moreover, in the case where the BS requires knowledge of Physical CINR of preamble R3 to make a more precise judgement on the zone allocation (R1 or R3), then a new CQICH_Allocation_IE (related to Channel 1) will also be required by the MS. It is clear that this method is inefficient and can lead to an increased signalling overhead, latency in link adaptation and system complexity which can ultimately lead to a degradation in system performance.

Embodiments of the invention introduce signalling that will allow the BS to instruct the MS to alternatively report a number of different measurements on the same CQICH channel. This allows the BS to collect the desired information with respect to the MS' current or long term channel conditions and ultimately allow efficient management of resources without increasing the signalling and CQICH channel overhead.

Thus, using embodiments of the present invention, the above mentioned problem can be solved without increasing the required signalling and system complexity. Using the same case as before, the required measurements can be alternated on the allocated CQICH channels as follows;

CQICH Channel 1 (Alternating between Physical CINR from Preamble R1 and Physical CINR from Preamble R3)

CQICH Channel 2 (Alternating between Effective CINR from Pilots of R1 zone and Effective CINR from Pilots of R3 zone)

Figure 3:
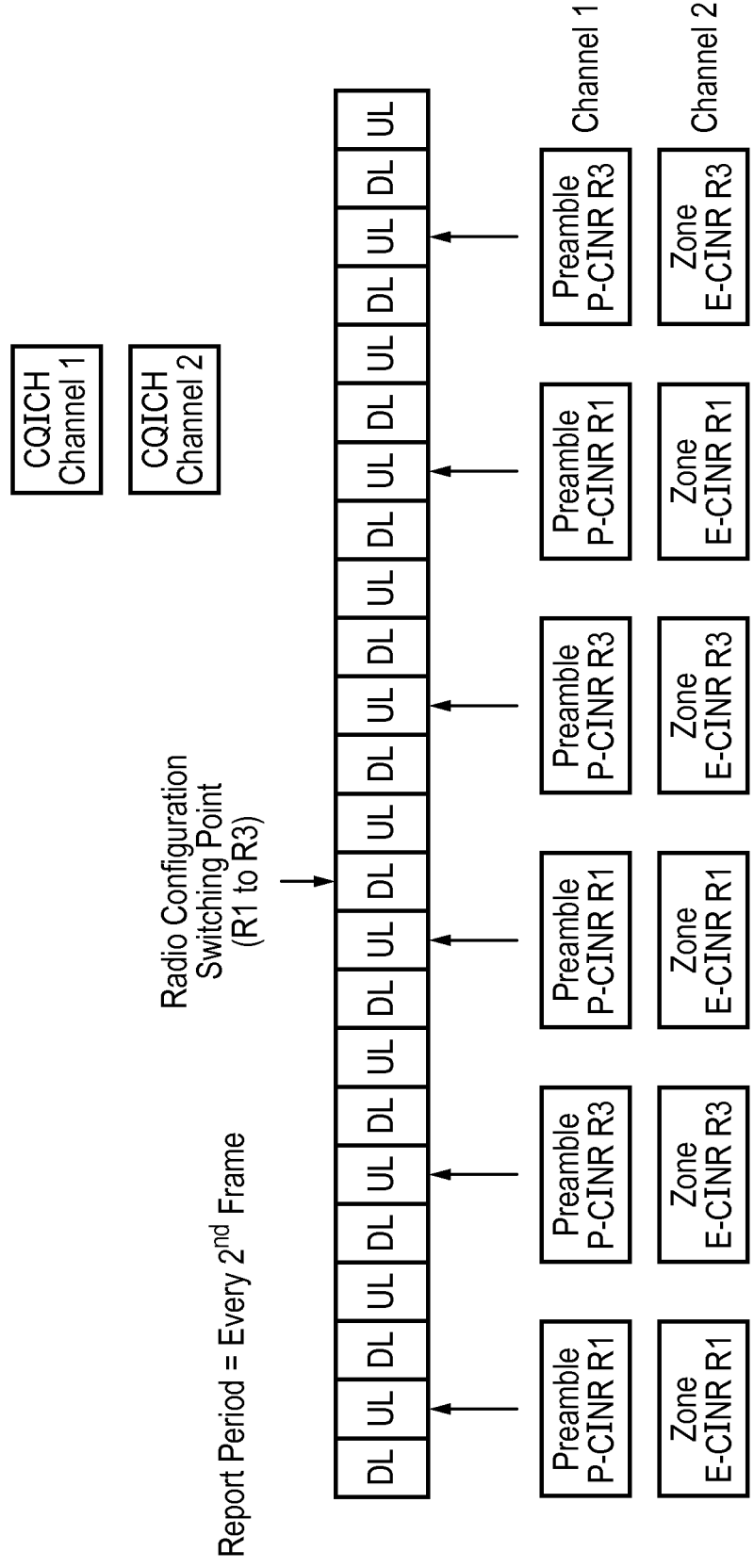
FIG. 3 is an illustration of a CQICH mechanism according to embodiments of the preferred invention.

FIG. 3 highlights this configuration, where Channel 1 and Channel 2 are shown in the same positions as before. In this case, where the measurements are alternated, the BS will be provided with all the necessary information to effectively assign the MSs to either R1 or R3 zones. Moreover, the BS will also have the desired information to accurately assign an appropriate MCS (Modulation and coding scheme) for the specific zone in which the MS has been allocated data. For instance, when the BS decides to change the Radio Configuration of a particular MS, it will have prior knowledge of the radio characteristics that the MS will experience under the different radio configurations.

It can be seen, for this configuration, there is no need for the BS to send a new CQICH Allocation IE when the radio configuration changes, thus reducing the signalling overhead when compared to the example in FIG. 2.

Wireless technology is constantly evolving and standards are designed to take advantage of cutting edge concepts. Embodiments of the invention can be applied to FFR and many other more complex configurations, therefore allowing the BS to perform its radio resource management in the most robust manner possible with the ultimate goal of providing advanced user (MS) performance.

Figure 4A:
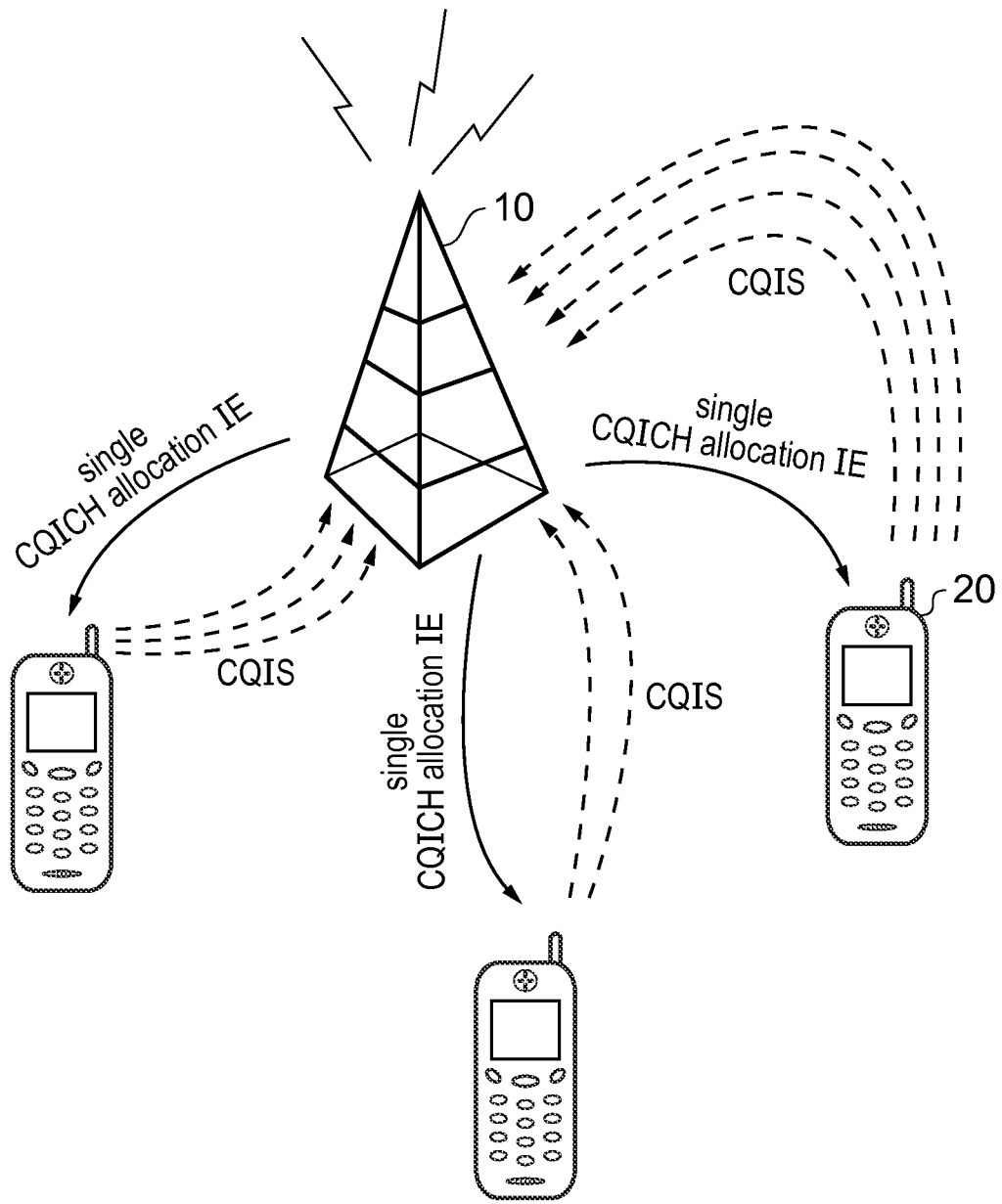
FIG. 4a is a schematic diagram of a wireless network according to invention embodiments.

FIG. 4a is a schematic diagram illustrating a wireless communication network according to an embodiment of the present invention. First communication apparatus 10 is shown as a base station communicating with mobile stations 20 within its cell. The base station includes control circuitry which may be hardware, software or a mixture of the two and is operable to decide for each MS 20 which CQI's are to be transmitted and the pattern in which they are to be transmitted. The base station also includes transmission circuitry which again can be implementable in hardware, software or a mixture of the two and which is operable to transmit a CQICH_allocation_IE indicating how the MS concerned is to interchange between sending the different CQI measures.

Each MS 20 is operable to transmit the requested CQI's. As shown, each MS can be instructed to transmit a different set of interchanging indicators.

Figure 4B:
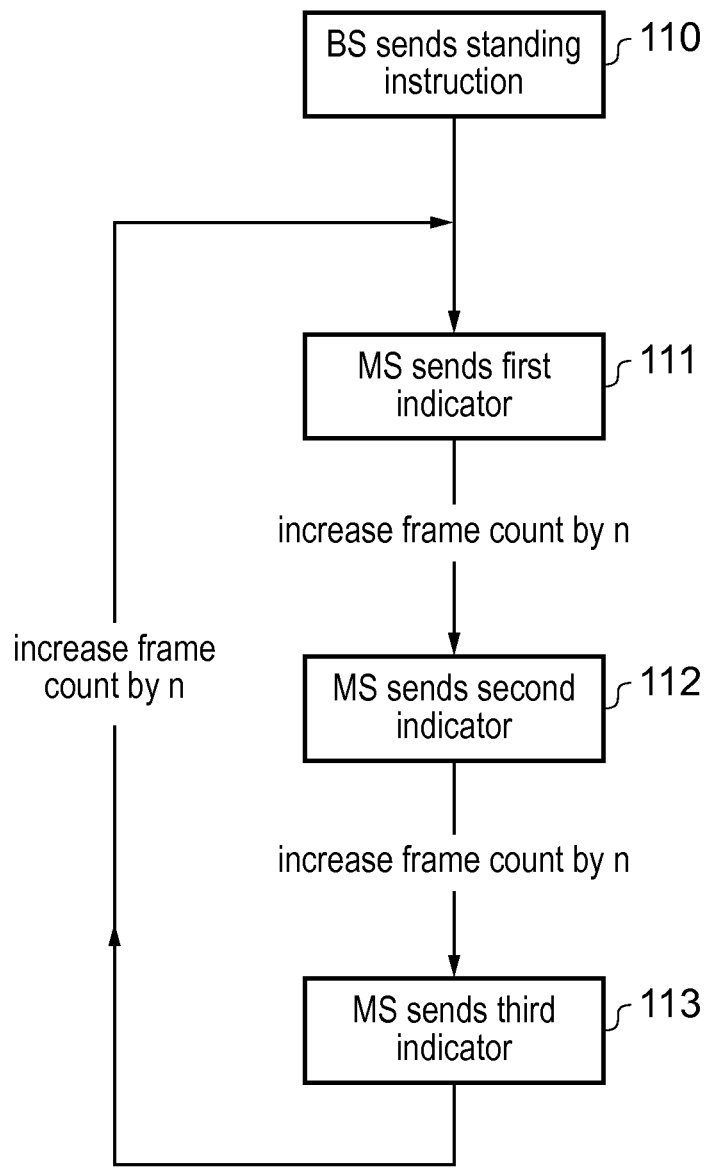
FIG. 4b is a flow diagram illustrating a general embodiment of the present invention.

FIG. 4b is a simple flowchart demonstrating a method according to an embodiment of the present invention. In step 110 the base station sends a standing instruction or IE to the MS instructing an alternating or interchanging transmission of channel indicators or other characteristic reports. In step 111 the MS sends a first indicator in a given frame. The frame count is then increased by n (one or more, depending on whether an indicator is to be sent in each frame or whether there are to be frames without indicators). In step 112 the MS sends the second indicator in the current frame. The frame count is then increased by n again and in step 113 the MS sends a third indicator. In this example, three indicators are provided and therefore once the frame count has been increased a third time, the method returns to sending the first indicator. The method will continue until there is a superseding instruction. As noted above, the need for the BS to send out new instructions has been decreased by the ability to send an alternating indicator which can allow assessment of different transmission options/techniques.

In preferred embodiments, providing a plurality of different characteristic indicators can allow the BS to control a switch to a preferred transmission technique because the BS has approximately concurrent access to a CQI giving a report for each technique. For example, this can help the BS to choose between:

Reuse1/Reuse3 (FFR)

Localized/Distributed Subchannelization (AMC/PUSC)

Adaptive MIMO Switching (AMS)

MIMO-A/MIMO-B (STC/SM)

SU-MIMO/MU-MIMO (Single-user MIMO/Multi-user MIMO).

Embodiments of the invention facilitate the use of a combination of modern transmission techniques to maximize system benefits. For example (and as a non-exhaustive list of suggestions) the following techniques may be combined:

FFR with Localized/Distributed sub-channelization

FFR with AMS

AMS with Localized/Distributed sub-channelization

FFR with MU-MIMO.

There are many more possible configurations.

In a preferred specific embodiment of the present invention, a single standing instruction can be used to provide four alternative reports in a single CQICH channel. FIG. 5 is a table defining an IE written to bring the interchanging indicators of the invention embodiments into effect for CQI measures in WiMAX.

Here, the alternate reports section in the table gives a maximum of four alternative reports using the same CQCIH_ID or slot. Depending on the measurements required, the BS will thereby have the flexibility to control which statistics it requires from the MS without unnecessarily increasing the signalling overhead.

FIG. 6 provides an indication of the required number of PUSC slots in the uplink feedback region in one embodiment. Here "n" denotes a CQICH interval, assuming two CQICH channels are allocated to each MS. The required number of slots is halved in a case where only one CQICH channel is allocated to each user per frame.

As can be seen from FIG. 6, if there are 64 users serviced by the BS, and if the CQICH is transmitted in each frame, 128 slots will be required for CQICH purposes. If, however, only 8 users are supported by the BS and a CQI measurement is provided once every 8 frames, then only 2 PUSC slots are required.

SUMMARY & BENEFITS

Embodiments of the invention address the need for a requirement of multiple channel estimate or other reports by proposing a novel Signalling mechanism for CQICH and other indicators at the BS without adding to the signalling overhead and at the same ensuring a reasonable rate of feedback. The new scheme proposes time-interleaving of the multiple channel reports within a MS' allocated feedback channel, so that the reports are alternated/interchanged at every feedback interval. This can be achieved by having the BS instruct the MS to alternate between reporting different measurements on the same CQICH channel without increasing the signalling overhead in the UL-MAP. Thus preferred embodiments can lead to an overall increase in system efficiency and better radio network performance by:
  a. Supporting more than two CQICH reports for a given user without increasing signalling overhead, thus leading to accurate radio/link adaptation.
  b. Enhancing radio network performance by enabling fast channel adaptation especially for high mobility users.
  c. Increasing the capacity of a network by reducing signalling and UL control overhead.
  d. Providing added flexibility to BS scheduling by allowing both BS and MS initiated radio configuration adaptation.
  e. Providing ease in implementation thus reducing system complexity.

In the above description, the second communication apparatus has been termed the MS, whereas the first communication apparatus has been referred to as the BS. However, this is not limiting, and the skilled reader will appreciate that the first apparatus may be an RS or other entity and that independently the second apparatus may be an RS or other entity. The only limitation intended is the uplink/downlink relationship between the first and second communication apparatuses and the correspondence of a single first apparatus to a plurality of second apparatuses.

The invention claimed is:

1. A method of requesting a plurality of different characteristic indicators from a second communication apparatus in a wireless communication network comprising a first communication apparatus and a plurality of such second communication apparatuses which communicate with the first communication apparatus using frames, the method comprising:
    the first communication apparatus transmitting a single standing instruction comprising an allocation information element (IE) to the second communication apparatus instructing the second communication apparatus about a way to interchange between different characteristic indicators,
    in response to the single standing instruction, the second communication apparatus:
    a) sending a first characteristic indicator comprising a physical channel quality indicator in a feedback window of a first frame and increasing a frame count by n, where n is a natural number,
    b) sending a second characteristic indicator comprising an effective channel quality indicator in a feedback window of a second frame, and increasing the frame count by n, and
    c) repeating steps (a) and (b),
    wherein the second frame is transmitted n frames after the first frame.

2. The method according to claim 1, wherein at least one of the characteristic indicators is a characteristic indicator which is not used for assessing transmission at the time when the method commences.

3. The method according to claim 1, wherein the first communication apparatus also transmits to the second communication apparatus a specification of the feedback window, including a feedback timing and a feedback frequency range within respective frames.

4. The method according to claim 1, wherein the single standing instruction instructs an interval at which the feedback window occurs.

5. The method according to claim 1, wherein a feedback window accommodates only one of the first characteristic indicator and the second characteristic indicator in any given frame.

6. The method according to claim 1, wherein the first communication apparatus transmits the single standing instruction in a downlink frame, instructing the second communication apparatus to send the characteristic indicators in subsequent uplink frames.

7. The method according to claim 1, wherein the characteristic indicators are used in the first communication apparatus to assess transmission parameters and modify them as necessary.

8. A method of transmitting a plurality of different characteristic indicators from a second communication apparatus in a wireless communication network comprising a first communication apparatus and a plurality of such second communication apparatuses, the method comprising:
    the second communication apparatus receiving a single standing instruction comprising an allocation information element (IE) from the first communication apparatus, the single standing instruction instructing the second communication apparatus about a way to interchange between different characteristic indicators;
    in response to the single standing instruction, the second communication apparatus:
    a) sending a first characteristic indicator comprising a physical channel quality indicator in a feedback window of a first frame and increasing a frame count by n, where n is a natural number,
    b) sending a second characteristic indicator comprising an effective channel quality indicator in a feedback window of a second frame, and increasing the frame count by n, and
    c) repeating steps (a) and (b),
    wherein the second frame is transmitted n frames after the first frame.

9. The method according to claim 8, wherein the second communication apparatus is operable to determine the characteristic indicators before sending them.

10. The method according to claim 8, wherein the second communication apparatus sends the interchanging characteristic indicators to the first communication apparatus until the next standing instruction or until another superseding instruction.

11. A method of providing a first communication apparatus with a plurality of different characteristic indicators from second communication apparatuses in a wireless communication network comprising the first communication apparatus and a plurality of such second communication apparatuses which communicate with the first communication apparatus using frames, the method comprising:
- the first communication apparatus transmitting a single standing instruction comprising an allocation information element (IE) to a second communication apparatus instructing the second communication apparatus about a way to interchange between different characteristic indicators,
- in response to the single standing instruction, the first communication apparatus:
  - a) receiving from the second communication apparatus a first characteristic indicator comprising a physical channel quality indicator in a feedback window of a first frame,
  - b) receiving, from the second communication apparatus, a second characteristic indicator comprising an effective channel quality indicator in a feedback window of a second frame, the second frame being n frames after the first frame, where n is a natural number; and
  - c) repeating steps (a) and (b).

12. A first communication apparatus in a communications network comprising the first communication apparatus and a plurality of second communication apparatuses which communicate with the first communication apparatus using frames and which provide the first communication apparatus with a plurality of different characteristic indicators, the first communication apparatus comprising:
- a transmitter configured to transmit a single standing instruction comprising an allocation information element (IE) to a second communication apparatus instructing the second communication apparatus about a way to interchange between different characteristic indicators,
- a receiver configured to, in response to the single standing instruction:
  - a) receive from the second communication apparatus a first characteristic indicator comprising a physical channel quality indicator in a feedback window of a first frame,
  - b) receive from the second communication apparatus a second characteristic indicator comprising an effective channel quality indicator in a feedback window of a second frame, the second frame being n frames after the first frame, where n is a natural number; and
  - c) repeat steps (a) and (b).

13. A second communication apparatus in a communications network comprising a first communication apparatus and a plurality of such second communication apparatuses which communicate with the first communication apparatus using frames and which provide the first communication apparatus with a plurality of different characteristic indicators, the second communication apparatus comprising:
- a receiver configured to receive a single standing instruction comprising an allocation information element (IE) instructing the second communication apparatus about a way to interchange between different characteristic indicators;
- a transmitter configured to, in response to the single standing instruction:
  - a) send a first characteristic indicator comprising a physical channel quality indicator in a feedback window of a first frame,
  - b) send a second characteristic indicator comprising an effective channel quality indicator in a feedback window of a second frame;
  - c) repeat steps (a) and (b), and:
- control circuitry configured to:
- increase a frame count by n each time the transmitter performs step (a) where n is a natural number;
- increase the frame count by n each time the transmitter performs step (b);
- wherein the second frame is transmitted n frames after the first frame.

14. A wireless communication network comprising:
- a first communication apparatus; and
- a plurality of second communication apparatuses which communicate with the first communication apparatus using frames and which provide the first communication apparatus with a plurality of different characteristic indicators, wherein:
- the first communication apparatus is operable to transmit a single standing instruction comprising an allocation information element (IE) to the second communication apparatus, instructing the second communication apparatus about a way to interchange between different characteristic indicators; and
- the second communication apparatus is operable to receive the standing instruction from the first communication apparatus and
- in response to the single standing instruction:
  - a) to send a first characteristic indicator comprising a physical channel quality indicator in a feedback window of a first frame and to increase a frame count by n, where n is a natural number,
  - b) to send a second characteristic indicator comprising an effective channel quality indicator in a feedback window of a second frame,
  - and to increase the frame count by n, and
  - c) to repeat steps (a) and (b);
- wherein the second frame is transmitted n frames after the first frame.

15. A non-transitory computer readable medium comprising a computer program which when executed on a communication apparatus in a wireless communicating network, causes that apparatus to carry out a method according to claim 1.

16. A method according to claim 1, wherein the characteristic indicators are reports used in efficiently managing radio resources.

17. A method according to claim 1, wherein the characteristic indicators are different radio characteristics.

* * * * *